United States Patent [19]

Pinson et al.

[11] Patent Number: 4,851,916

[45] Date of Patent: Jul. 25, 1989

[54] ELECTRONIC SHUTTER DEVICES

[75] Inventors: Yannick Pinson; Alain Ricros, both of Bordeaux, France

[73] Assignee: Imagie Industrie Systeme, Bordeaux, France

[21] Appl. No.: 211,115

[22] Filed: Jun. 21, 1988

Related U.S. Application Data

[63] Continuation of Ser. No. 923,321, Oct. 27, 1986, abandoned.

[30] Foreign Application Priority Data

Oct. 28, 1985 [FR] France ................... 85 15 974

[51] Int. Cl.$^4$ .............................................. H04N 3/14
[52] U.S. Cl. ............................ 358/213.19; 358/213.13
[58] Field of Search ...................... 358/213.19, 213.26, 358/213.31, 210, 214, 213.13

[56] References Cited

U.S. PATENT DOCUMENTS

| | | | |
|---|---|---|---|
| 4,382,267 | 5/1983 | Angle | 358/213.19 |
| 4,394,089 | 7/1983 | McIntosh et al. | 358/214 |
| 4,475,131 | 10/1984 | Nishizawa et al. | 358/335 |
| 4,630,120 | 12/1986 | Childs | 358/214 |
| 4,686,572 | 8/1987 | Takatsu | 358/213.11 |

FOREIGN PATENT DOCUMENTS

| | | |
|---|---|---|
| 0087284 | 8/1983 | European Pat. Off. . |
| 0093077 | 11/1983 | European Pat. Off. . |
| 0095541 | 12/1983 | European Pat. Off. . |
| 2384407 | 10/1978 | France . |
| 2083968 | 3/1982 | United Kingdom . |

OTHER PUBLICATIONS

Toute L'Electronique 495, 35-40 (1984), "Imagerie Numérique: Caméra linéaire, à transfert de charges".

Primary Examiner—Jin F. Ng
Assistant Examiner—Stephen Brinich
Attorney, Agent, or Firm—Michael N. Meller

[57] ABSTRACT

The present invention concerns a device for controlling photosensitive sensor image taking equipment, which comprises at least one logic assembly transmitting the image taking, transfer of signals emitted by the photosensitive elements from the integration zones to the reading assembly then to at least one memory register, the image taking being initiated at the desired moment, the durations of the image taking being adjusted as to the conditions of the subjects with respect to the light, in order to obtain optimal images, the actuation and the reading duration being controlled by the logic assembly, the subsequent successive transfers being performed once the preceding operations have been completed and when the delays inherent in the constitutive elements allow it.

19 Claims, 2 Drawing Sheets

ELECTRONIC SHUTTER DEVICES

This application is a continuation, of application Ser. No. 923,321, filed 10/27/86, now abandoned.

FIELD OF THE INVENTION

The present invention concerns novel devices for controlling equipment for taking images or pictures through solid state photosensors or pick-ups. More generally, it concerns electronic shuttering and its applications to all image taking equipment for single, multiple or in-series images involving programmable and/or adjustable (initiating) aperture duration and/or reading. In particular, it applies to optoelectronic control and/or supervision systems, the data of which are intended to be stored in memory and/or processed and/or displayed.

BACKGROUND OF THE INVENTION

Optoelectronic control and supervision are increasingly wide-spread but, raise numerous problems when, especially in high-rate production industries, it is desired automatically to detect anomalies exhibited by objects circulating, for example, at high speed, at high rate, at an irregular frequency or, furthermore, under random brightness conditions.

For example, high speed circulation brings about, in numerous image taking apparatus and especially in conventional video cameras, deformations of the objects observed; the high rhythm is generally incompatible with video or equivalent standards of which the number of images per unit of time can be insufficient; the irregularity of appearance frequency of the objects in the field of observation brings about numerous disturbances, and especially irregular images, even partial images or the absence of the object in the picture-taking field. Furthermore, variations of different optical conditions (especially luminosity and transparency) in addition to the cinematographic irregularities set out herein-above, create supplementary difficulties when it is sought to analyze the images which are required to be as uniform and regular as possible.

SUMMARY OF THE PRESENT INVENTION

The aim of the present invention is therefore in particular to obtain with one and the same material either continuous images (in the cinematographic meaning of the term) or images shot by shot as clear and as regular or uniform as possible. In order to schematize this object, it could be said that the invention is aimed at gathering images of the stroboscopic type but at frequencies and under picture taking conditions adapted to the appearance within the field of each object to be observed, these images being transformed into data adapted to be progressively stored in memory and/or processed and/or displayed, as they are received.

Due to such devices according to the invention, it becomes possible to initiate an image taking at any desired moment, to adjust the aperture time of the shutter to the duration desired, to initiate reading at the desired moment and to read during the time desired, thereby allowing simultaneous or single instantaneous picture taking or taking pictures in series at an irregular rhythm and in any event (single or in-series picture taking) with a variable aperture duration and a variable reading speed or rate. It is thus possible to follow any shutter opening and closing program. For example, it will then be possible to supervise a very high-rate production output at an irregular rhythm, while detecting poor workmanship and more generally all defects, the system allowing, for example, automatic actuation of an alarm, and/or to order the removal of objects that do not conform to standards, and/or to calculate statistical data related to the manufacturing quality. It will be understood that while generally the flow rate is substantially smaller than the number of pictures per time unit of a conventional camera, complex problems arise once the flow rate is increased. Supervising the high speed molding of plastic pieces, the high-speed stamping out of metallic pieces, the high-speed printing of paper or textile are only a few of the many fields in which the invention can be applied. In certain cases, the rates high are regular, thereby slightly reducing the severity of these problems. The invention can be advantageously applied if the frequencies have random values and if, as set out herein-above, the mechanical and optical conditions vary from one object to another. It is therefore possible to reduce aperture time in strong light or when the scene is rapid and vice versa under contrary conditions, which data constitute basic operational criteria of an electronic shutter. It also becomes possible according to the type of utilization (framing by window, sub-sampling, for example) to accelerate the picture or image reading.

The invention also has a worthwhile application in the control of a plurality of cameras, thereby allowing, especially in the case of supervision, to simultaneously initiate the aperture of the shutter and thus the picture taking (or "shooting") for all cameras and sequentially to carry out the readings. The man skilled in the art can imagine upon this basis numerous other combinations.

The problem of controlling objects with random characteristics has already been dealt with in a very limited way for the control of bottles and other objects made of glass in European patent application No. 0 095 541 (RICROS et al.)

Said application describes a device and a process for the automatic inspection by transparent contrast in which linear or matrix photosensitive device cameras are associated with shift registers and with point or dot registers so as to weight the points or dots surrounding a given dot, the comparison with the weighted level of the dot considered and that of the adjacent dots being achieved through an adder connected to binary outputs of the dot registers, the output of the adder being connected to one input of a comparator the other input of which is connected to a signal source delivering a programmable value, while the output of said comparator is connected to a counter.

This prior arrangement thus is aimed at solving a specific and restricted problem, and fails to confer on the material—which in addition, includes specific mechanical devices—the desired polyvalency.

Furthermore it will be noted that the current trend of technology has resulted in offering industry a wide variety of optoelectrical sensors or pick-ups such as, for example, charge transfer device (CTD) sensors in which the energy of photons striking a photosensitive point is converted into electrical charges.

In the following description, and for clarity sake, reference is mainly made to CTD sensors and more particularly to charge coupled device (CCD) type sensors, although the present invention can apply equally well to any optoelectrical sensor in which the luminescent energy received at each point is converted into electronic data (generally, a signal) adapted to be stored in memory, processed, displayed or to be subjected to any other operation based upon the electronic picture or image thus constituted by the whole of the data corresponding to each point of the image.

In the following description, for simplicity's sake the vocabulary generally adopted in the field of CTD sensors and in particular CCD sensors will be used. It concerns assemblies of punctata sensors usually formed of MOS (Metal Oxide Semiconductors) type cells. These sensors are generally mounted in matrices in the image- or picture-taking devices herein-after referred to, for enhanced simplicity, as "cameras", each elementary cell emitting a quantity of electricity proportional to the luminous flux received, thereby allowing electronic images defined cell by cell and thus dot by dot. Each of these dots is called a "pel" (elementary point) or "pixel" (picture element) and the corresponding luminous intensity expresses the energy of each of the photons striking the photosensitive cell, in terms of charges corresponding to the occurrence of electron-hole pairs or couples. The matrix or linear assembly of the photosensitive cells constitutes what is referred to hereinafter as the "integration zone" ZI, i.e. the zone in which the optical image projected on the entire cell assembly is converted into an electronic image.

Any non-photosensitive reading zone ZL is associated with the preceding zone into which the electronic image formed on the zone ZI is transferred. It will be noted that the zone ZI can be divided up into ZI type elementary zones, for example into columns, each of which is associated with a ZSL type elementary zone. In the case of the zone ZI covering the whole of the image within a single unit, the zone ZL can be adjoining. In the case of the zone ZI being divided up e.g. into columns, it is possible to alternate ZI type columns with ZL type columns and thus to cover the whole of the image. In an analogous manner, it is possible to proceed similarly by lines.

The electronic data corresponding to each pel are transmitted pel by pel, and/or line or column by line or column, and/or raster by raster, and/or image by image from the zone ZI (unique or divided) to the zone ZL (unique or divided) and thereafter to registers for storing (memorizing) and/or processing and/or displaying. It will be noted, in particular, that if it is desired to visualize the image on a cathode screen, which necessarily requires compatibility with television standards, utilization is made on interlacing lines, i.e. of the splitting up of the image into an odd number line raster and an even number line raster, which explains the introduction made herein-below of the motion of raster.

In terms of electronics, each pel thus becomes apparent through a pulse the amplitude of which is substantially proportional to the corresponding luminous flux. Pulse trains thus correspond to the lines and, where applicable, to the rasters, and to the images.

The main interest of these charge coupled sensors (charge transfer sensors) thus lies, apart from their simplicity, their solid state and their small dimensions, in the flexibility of their utilization. However, the present invention is not limited to this type of sensor. In fact, it applies to any system in which one or several sensors convert the luminous or electric energy dot by dot, these punctate sensors being independent and/or associated by lines or columns and/or associated in matrixes (generally Cartesian).

According to the present invention, the picture or image taking is controlled, as initiated, for example, upon the appearance, in the field of the camera, of the object to be observed, by adjusting the image taking conditions in accordance with the characteristics of the object (displacement speed, luminosity, etc.) and then by controlling, the image-taking operation is terminated, the transfer of the electronic data during the image-taking towards the reading and/or storing zones and/or the processing and/or displaying zones, by adapting the durations of these operations so that strictly required by the computer or other equipment intended to perform these various operations. The best data for eventual subsequent use is thus obtained in a minimum of time, namely elimination of faulty goods, alarm actuation, statistical processing, production of a control journal, control and adjustment of the conditions of production, etc.

It is therefore possible to control at will the initiation and the duration of the open aperture, i.e. the image-taking or the integration, and the initiation or actuation and the reading period, it is also possible to coordinate the operation of several image-taking devices with or without a common reading (simultaneous or sequential image-taking, simultaneous readings in several reading devices, or sequential readings in a common reading device, etc.). It will thus be easy to imagine the vast potential of application thereby available, especially in the field of supervision, and in all fields currently restricted to photography, cinematography, television or others, and in the field of automats operating from image-taking devices (manufacture, security, guiding, medicine, etc.).

The present invention thus mainly concerns a device for controlling solid state photosensor image-taking devices presenting at least one image-taking zone referred to as an "integration zone" constituted by photosensitive elements and at least one reading assembly receiving the signals emitted by the photosensitive elements, which device comprises at least one logic assembly transmitting the image-taking commands, the command for transfer of signals emitted by the photosensitive elements from the integration zones towards the reading assembly then towards at least one memory register, the initiation of image-taking being performed when the objects to be recorded are in the most favorable conditions, the duration of the image taking being adjusted to the conditions of the objects as to the lighting, in order to obtain optimal images, the subsequent successive transfers being performed once the preceding operations are completed and after the delays inherent in the constitutive elements.

More specifically, the present invention concerns any device for controlling solid state photosensors for image taking, presenting at least one zone of image taking called an "integration zone" constituted by photosensitive elements and at least one reading zone receiving the signals emitted by the sensitive elements in order to memorize and/or process them, said device being adapted to be incorporated in an assembly or camera for taking images of stationary or moving objects, wherein upon initiation of image taking a logic assembly renders the exposure time (or integration time) dependent upon the physical properties of the object and controls the actuation and the duration of the reading independently from the object observed from the desired moment and during the time required, these successive operations being initiated once the preceding operations have been completed and when the delays inherent in the constitutive elements allow it.

In devices of this kind, the photosensors are preferably of the charge coupled (i.e. charge transfer) type, the signals being transmitted according to selected modes, e.g. image by image, and/or raster by raster, and/or column or line by column or line and/or dot by dot.

The image taking is manually or automatically initiated (for example, by a program or a sensor) indicating that the objects to be recorded are in optimum conditions (position, lighting, transparency) either in the absolute, or in comparison with the references of the objects previously recorded. The duration of the image taking is controlled from sensors taking into account the conditions (lighting, position of the objects, speed of displacement) in such a way as to optimize the quality of the image, i.e. a good sharpness while retaining a good contrast.

It is obvious that the direct or indirect control, effected separately and successively, of the operation of the two essential phases indicated herein-above (integration and reading) and the possible subsequent phases allow them to be independent of any rigid standard, as in the case of television, and to adapt the frequency of the images to that of the objects to be observed. It is thus possible, for example, to obtain on a conventional video display an image taken shot by shot, well centered, free of deformations, sharp and clear; this therefore allows, of course, initiation of any convenient operation as soon as an anomaly with respect to the other images or to a reference image appears.

The modulation and the servo-control of the initiation and the duration of the operations thus allows an optimum quality yield of the quality with respect to the duration. Depending on the type of sensors used, it is possible to initiate successively and alternately integration and reading, or to pass more rapidly from one integration to the other if the reading of an image or of a raster can be performed during the integration of the image or of the following raster. It is also possible to ensure the initiation and to submit the durations of the operations to servo-control taking into account the windows and the sub-sampling.

The termination of the integration phase can be controlled in different ways, e.g. through screening, through suppression of the lighting of the object, through interruption of the luminous beam between the object and the sensor, through de-energizing the sensors, etc. If it is desired, such a system can obviously be utilized in the same way as a conventional camera, i.e. with successive image taking at a regular rhythm. But it is, furthermore, possible in this case to maintain the automatic adjustments, for example, in order to compensate for lighting variations.

In the particular case of the charge transfer devices and especially of the CCD type sensors, it is also possible to initiate the integration in the zone ZI at the desired moment, to program the integration time TI in accordance with the characteristics of the object or the subject whose image is to be taken, to give the order to transfer data relating to the electronic image from ZI to ZL at the end of the time TI then from ZL to the registers at the desired rhythm. TI can thus vary from one image taking to the following. It is also possible to allocate to the integration the time necessary to obtain a good quality image (which is difficult with conventional equipment), for example, when it is desired to survey or control objects that are displaced at a desired moment, thereby allowing one to obtain regular images, even for objects having irregular appearances or movements. With respect to the processing of the results, it is possible to bring it to the rhythm of the equipment and in particular of the calculator that empties the register and which receives data corresponding to images of good quality.

Such devices according to the present invention thus also allow both continuous as well as shot by shot operation, and apply to cinematography and photography with programmable action and shuttering, i.e. series or isolated shot operation or furthermore to image taking by a plurality of cameras.

One of the problems that can also be overcome is that of the compatibility with video devices, especially if it is desired to visualize upon a conventional cathode screen or to record on a conventional magnetic video support. It is then necessary to ensure the synchronization between the various elements by any conventional means due to one or several blocked (gen-locked) pulse generators, thereby ensuring stability, especially if several cameras are utilized and if one camera is used after another. This is always the case when working continuously in order to synchronize the camera, image memory, visualization means or other constitutive elements. In the case of shot by shot operation, the problem occurs in a different way, as will be seen herein-after.

In any event, the access systems separated from the controls of the integration (ZI) and reading (ZL) zones constitute a main characteristic of the invention.

In order to render more apparent the technical characteristics of the advantages of the present invention, several embodiments will be described, it being well understood that these embodiments are in no way limitative as to their mode of reducing to practice and as to the applications that can be made thereof.

BRIEF DESCRIPTION OF THE DRAWINGS

Reference will be made to the following drawings which represent schematically:

FIG. 1 schematically represents a control assembly for a charge transfer sensor such as a CCD sensor allowing shot by shot working. This assembly receives either dot frequency pulses from the generator-clock FP, or pulses HE from an external clock which is adapted, for example, to synchronize the output data of each pel, the selection of either clock being performed by a commutator or switching device K. The dot frequency or external frequency pulses are transmitted, on the one hand, to the dot counter CP and, on the other hand, to one of the inputs of a first AND gate (ET1). The count in the dot counter CP (counting, for example, from 0 to 511) is output to a comparator assembly COMP.P which emits a signal at the end of each line, on the one hand, to an input of a second AND gate (ET2) and to an input of a third AND gate (ET3), and on the other hand, to a line counter CL, and furthermore to a state sequencer SEQ. This corresponds to the "end of line" and "beginning of the following line" datum. The state sequencer SEQ sends back to the dot counter CP a resetting (RAZ) pulse for the return to the beginning of the new line. The count in the line counter CL (from 0 to 511, for example) is output to a comparator assembly COMP.L which advises the state sequencer of the transfer of a certain number of lines and in particular whole of the image (end of the image and beginning of the following image). The state sequencer SEQ resets (RAZ) the line comparator assembly COMP.L for the return to the beginning of a new image.

In the present example, the images composed of lines and of dots without raster intermediary are considered. It is obvious that it is possible in an equivalent manner to count the odd-numbered lines, change the raster, count the even-numbered lines, change the raster and so on, especially in the case of the application of the invention to a conventional video display.

The state sequence SEQ receives, on the one hand, at FI integration frequency information in order to initiate the image taking, in synchronization with the event defined by any suitable means (object position sensor, for example), and, on the other hand, at CL the reading control information in synchronization with the processing means, i.e. the calculator assembly comprising the analog/digital converter, memories and other suitable components.

The three AND gates receive respectively on their second inputs the following enable signals:

for the gate ET1, issuing from the comparator assembly COMP.P, the gate emitting the dot shift signals φL of the reading register;

for the gate ET2, issuing from the state sequencer SEQ, the gate emitting the line shift signals φP of the image zone;

for the gate ET3, issuing from the state sequencer SEQ, the gate emitting the line shift signals φM of the memory zone.

These signals φL, φP and φM ensure the control of the charge transfer sensor assembly CTD or the like.

The charge transfer sensor device CTD or the like is disposed so as to receive the image of the object through the optics OPT. The output of this device transmits the signals to an analog/digital converter (CA/N) assembly receiving, furthermore, the dot frequency signals FP of the internal generator or the corresponding frequency of the external generator.

At the output of this generator CA/N, there are thus available binary signals corresponding to each pel, that can be stored in memory, developed, processed in a computer, displayed, copied, telecopied, used for image producing operations, as well as for all operations for processing said images or initiated thereby, such as sorting, control, regulating operations or more generally any operation based upon the interpretation of images.

Figure 1:
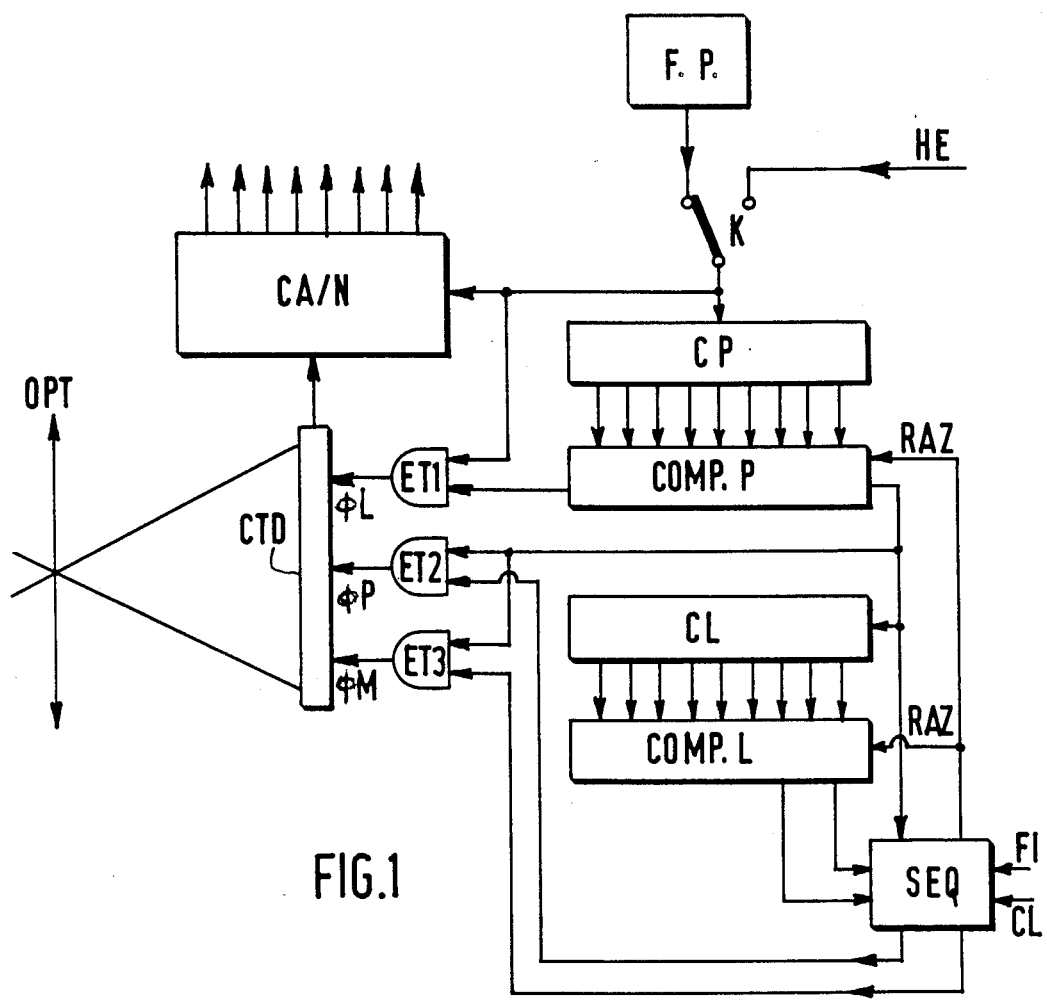
FIG. 1 a shot by shot camera and its associated circuits.
Figure 2:
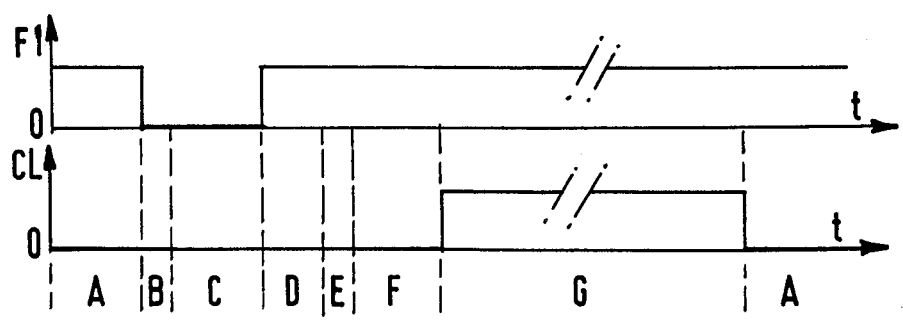
FIG. 2 an operation chronogram of the device represented in FIG. 1.

With reference to FIG. 2, which represents an operation chronogram of the device represented in FIG. 1, the state sequencer SEQ works under the following conditions:

when FI=1 and CL=0, the sensor CTD is awaiting integration A;

when FI falls to 0, the rapid transfer from zone ZI to memory zone ZM is ordered (image reset at B), then the integration of the light in the image zone (at C);

when FI returns to 1, the resetting of the memory zone (at D) then the transfer from the image zone to the memory zone (actual end of integration) (at E) are initiated; thus the apparatus is now awaiting the reading order CL (at F);

when CL undergoes the transition from 0 to 1, the reading phases of the memory zone are initiated through the output register of the CTD sensor;

at the end of each line, it is checked whether CL is still equal to 1. If CL has returned to 0, the reading transfers are interrupted while completing the reading of the line in operation. If CL passes again to 1, the reading of the following lines is authorized (in G). After reading of all of the lines, the sensor CTD returns to awaiting integration phase A.

It will be noted that according to the arrangement of the sensor, it is possible to work line by line or column by column if the linear integration zones alternate with the linear reading zones, or raster by raster or image by image if the integration and image zones cover respectively the whole of one raster or one image.

Figure 3:
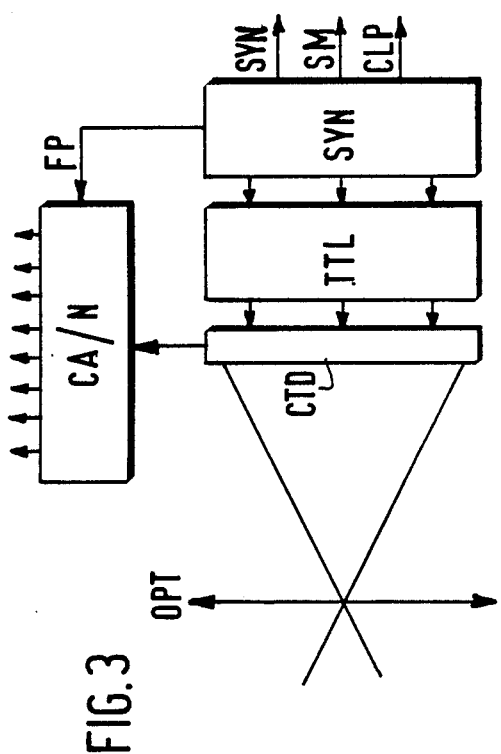
FIG. 3 a simplified diagram corresponding to FIG. 1.

The device represented in FIG. 1 may thus be constituted only by an optical system OPT, a CTD sensor, a CA/N converter processing the data that issue therefrom and a logic device, possibly of the TTL (or any other) type, controlled by a synchronization generator assembly SYN. This can be schematized as represented in FIG. 3.

Figure 4:
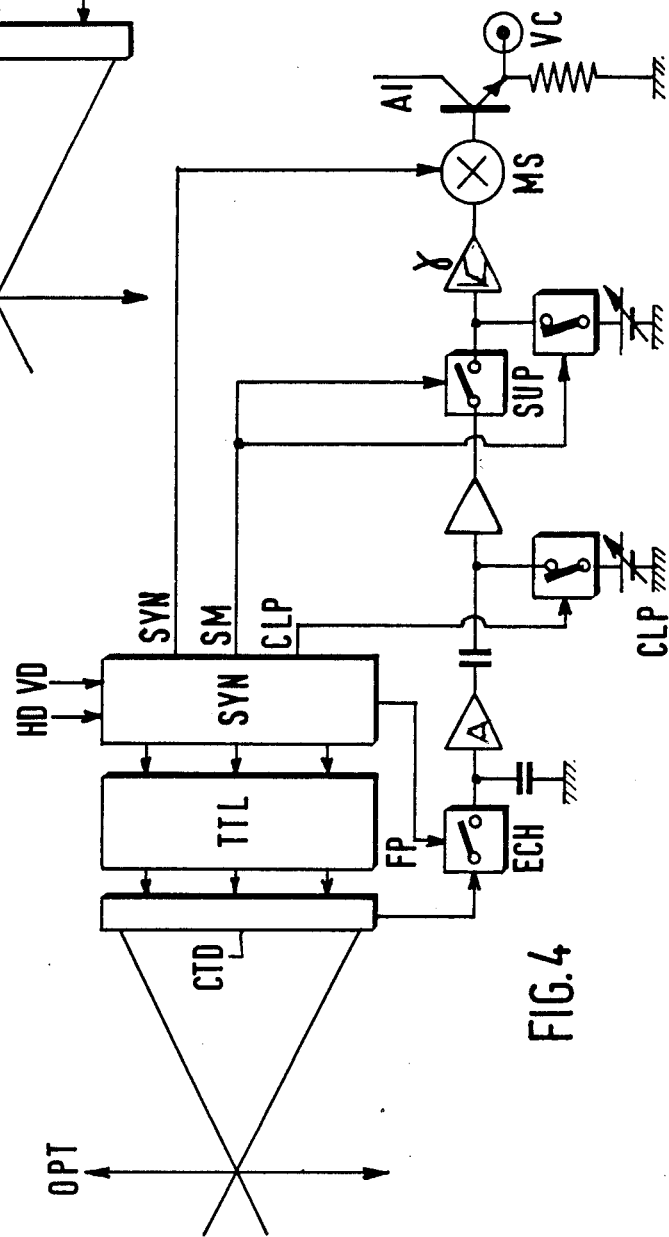
FIG. 4 a camera comprising the main elements of FIGS. 1 and 3 and adapted in order to deliver composite video signals.

It is possible, from the same basic elements, to define the new elements necessary to achieve a composite video output, such as will be seen with reference to FIG. 4.

FIG. 3 shows again the optical system OPT, the CTD sensor and the CA/N converter of FIG. 1, the rest being constituted by the TTL logic or other, for example of the MOS type, and by the synchronization generator SYN. The synchronization generator is connected to the possibly existing GEN-LOCK of another camera or any other component of the video assembly (which means, for example, by horizontal MD and vertical VD deviation signals). The generator emits the conventional signals towards other elements, such as SM, SYN, CLP (grey level) and those necessary for the working of the TTL+CTD assembly, the CA/N converter receiving the dot frequency signals FP.

FIG. 4 again shows the optical system OPT, the CTD sensor, the TTL (preferably MOS type) logic device and the generator SYN.

The signals issuing from the CTD sensor are sampled by switch ECH at dot frequency FP. Downstream, an amplifier A associated with two capacitors is followed by a black level circuit CLP connected to the synchronization generator SYN, followed by a suppression circuit SUP, by a corrector of a synchronization mixer MS and an impedance adapter in order to achieve a composite video output VC; suppressor SUP and mixer MS are connected in a conventional way to the synchronization generator.

FIG. 4 shows the main constitutive elements of the shot by shot camera of FIGS. 1 and 3 as a video output camera, thereby allowing a conventional displaying and recording.

It will be noted in the case of the automatic supervision devices that it is also possible, due to the fact that the physical optical cinematic or other totally aleatory or random conditions are taken into account, to envisage applications in fields where currently it is necessary to change the equipment. This is the case, for example, for day and night surveillance, where the equipment can be very different according to the conventional techniques. With devices according to the invention, the problems are automatically overcome.

As has already been stressed, on the basis of the characteristics of the present invention and due to the flexibility of the equipment used, those skilled in the art may envisage numerous applications whenever it is desired to take images or pictures and even more so when an automatic apparatus uses these images as on operating basis.

The intervention is not limited to the embodiments shown and disclosed herein. Many variants and modifications may be envisaged by those skilled in the art without departing from the spirit and scope of the invention as defined in the appended claims.

We claim:

1. A device for controlling solid state photosensor image taking equipment, having an electronic shutter controlled by external release means, said device comprising image integration zone means having a plurality of photosensitive elements, reading zone means for receiving and storing the signals output by said photosensitive elements, and logic means coupled to receive shutter release signals from said external release means and coupled to control integration by and reading from said image integration zone means, wherein in response to a predetermined control signal output by the shutter release means for initiating the image integration, said logic means calculates and controls the exposure time of said image integration zone means in dependence on the physical characteristics of the object the image of which is to be recorded, and calculates and controls the reading time, independently of said object, the start of said reading time being time-dependent on the end of the exposure time.

2. A device according to claim 1, wherein the shutter release signals are emitted manually.

3. A device according to claim 1, wherein the shutter release signals are emitted through at least one sensor sensitive to the movements of the objects and indicating that the objects are in the optimal condition for recording the image.

4. A device according to claim 1, wherein the shutter release signal is emitted for each image.

5. A device according to claim 1, wherein the shutter release signals are emitted sequentially for taking moving pictures.

6. A device according to claim 3, wherein the logic means outputs commands for transferring data from the image integration zone means towards the reading zone means when the duration of the image integration gives a correct image, taking into account the position, the movement and the lighting conditions of the objects.

7. A device according to claim 1, wherein in said logic means timing pulses are supplied to a dot counter and to one of the inputs of a first AND gate, the dot counter being coupled to a first comparator that outputs signals at each dot array end, on the one hand, to an input of a second AND gate and an input of a third AND gate, and on the other hand, to a dot zone counter, and furthermore to a state sequencer that sends back to the comparator a reset to zero pulse for the passage to the following dot array, a second comparator advising the state sequencer of the transfer of a certain number of lines and of the whole image, which resets the second comparator to zero.

8. A device according to claim 7, wherein the sequencer receives the integration frequency data in order to actuate the image integration and the reading order data.

9. A device according to claim 7, wherein the first, second and third AND gates receive respectively on their second input an enable signal issuing from said first comparator, thereby allowing the first AND gate to pass shift signals of the dot zone of the reading register, issuing from means for supplying said timing pulses; allowing the second AND gate to pass the shift signals of the image zone, issuing from the sequencer; and allowing the third AND gate to pass shift signals of the memory zone, issuing from the sequencer, all of the signals output by said AND gates controlling the photosensitive image integration zone means.

10. A device according to claim 7, wherein the shift operations are performed for linear zones.

11. A device according to claim 7, wherein the reading zone means comprises analog/digital converter means for outputting binary signals from each element of the image.

12. A device according to claim 7, wherein the timing pulses issue from a clock generator.

13. A device according to claim 7, wherein the timing pulses issue from an external clock.

14. A device according to claim 1, wherein the release of the shutters of several image taking equipment are actuated simultaneously.

15. A device according to claim 14, wherein the reading actuation is sequential.

16. A device according to claim 1, wherein the image of each object is taken in an identical position, which therefore gives images having identical dispositions.

17. A device according to claim 1, wherein the transfer speeds and the reading operation and memory storing operation durations are independent from the exposure duration.

18. A device according to claim 1, wherein the transfer speeds and the reading and storing in memory operation durations are independent from the scanning duration.

19. A device according to claim 1, wherein the actuation and the reading speed are servo-controlled by the windows or the sub-samplings.

* * * * *